united States Patent Office 2,909,080
Patented Oct. 20, 1959

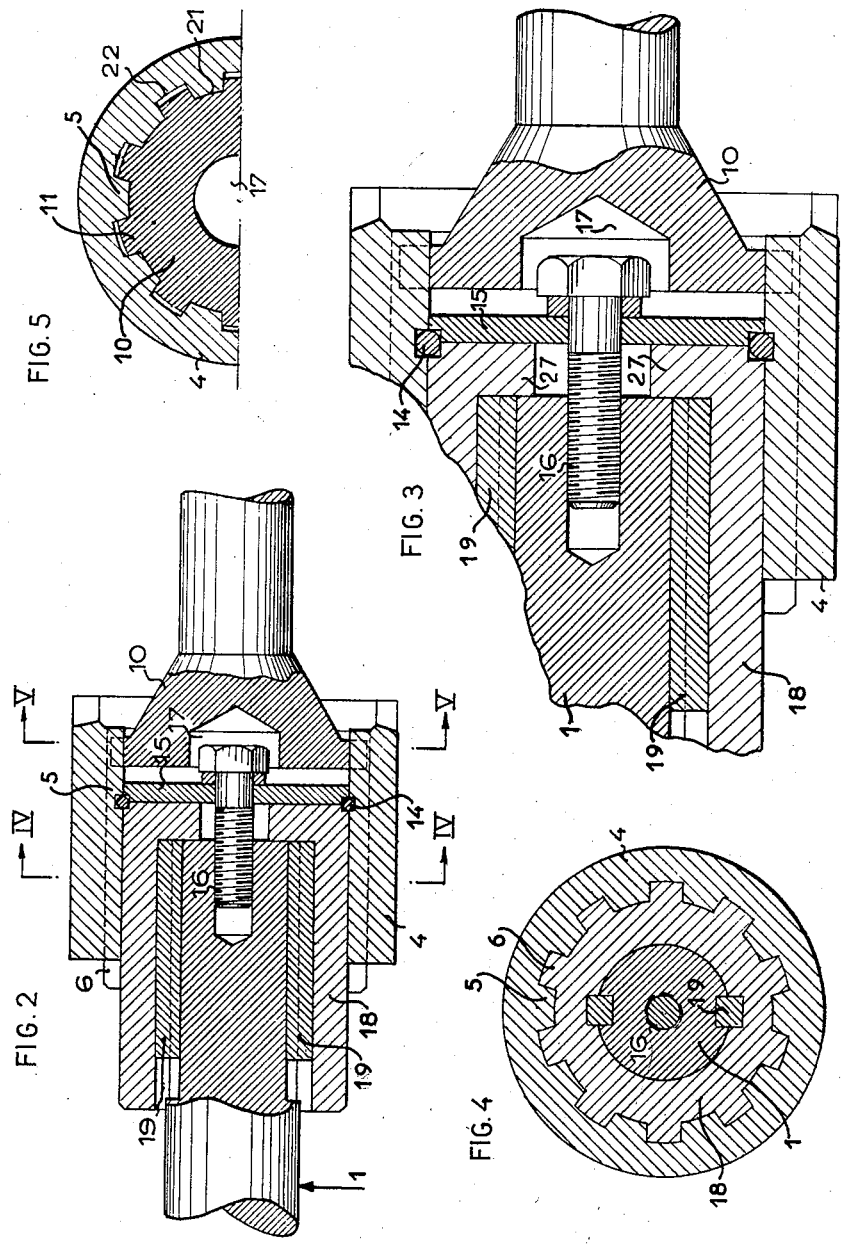

2,909,080
STARTING DEVICE AND POWER TAKE-OFF ARRANGEMENT

Jean Louis Gratzmuller, Paris, France

Application January 24, 1957, Serial No. 636,098

Claims priority, application France February 1, 1956

1 Claim. (Cl. 74—810)

This invention relates to an improved starting and power take-off assembly to be associated with a rotary member to which a starting motion is to be imparted, such as the crankshaft of an internal combustion engine or a counter-shaft geared to said crankshaft. It relates more particularly to such arrangements as include a starting device of the type having an axially slidable ratchet-toothed driving coupling member engageable with a complementary ratchet-toothed drivable coupling member mounted on said rotary member.

An object of the invention is to provide a power take-off shaft extending through the starting device and keyed on the rotary member without increasing the bulk of the whole assembly.

Another object of the invention is to provide a starting device and power take-off assembly of the type described of extremely simple and cheap construction.

Still another object of the invention is to provide a power take-off assembly highly resistant to torsional stresses.

Yet another object of the invention is to provide an assembly wherein the power take-off shaft is a part of the starting device and comes away with the starting device when the latter is detached from the rotary member associated therewith, being slidably and detachably keyed to a drivable coupling member fixable to the rotary member and engageable by the driving coupling member of the starting device.

In a preferred embodiment of the invention, the drivable coupling member is constituted by a sleeve mounted on the rotary part with one protruding end formed with internal keyways adapted to be engaged slidably by straight splines formed on the power take-off shaft and carrying on its terminal edge a suitable annular ratchet-toothing.

Still another object of the invention is to accommodate slight angular or axial mis-alignments between the rotary member and the starting device.

For this purpose, in an embodiment of the invention, the power take-off shaft and the sleeve are made of a very hard steel and the length of the splines on the power take-off shaft engaged with the keyways of the sleeve is preferably kept as short as possible to permit slight freedom of orientation of said shaft with respect to said sleeve, through sliding of said splines in said keyways, and said shaft is preferably journalled on said starting device as far as possible from said splines on a swivel bearing also permitting slight freedom of orientation of said shaft.

In this case, since the rotary part to be imparted with a starting motion is usually made of a material of lesser hardness, it is another object of the invention to interpose, between said sleeve and rotary part, rotational key means of greater length than said splines so as not to jeopardize the mechanical resistance to torsional stresses of the whole assembly.

In a preferred embodiment of the invention, where the rotary part to be driven is a shaft, the keying means of said rotary part and those of said power take-off shaft are constituted by straight splines having parallel and axial flanks and both meshing with a common set of internal keyways of the same shape formed in the internal wall of said sleeve.

How the foregoing objects, and such others as may hereinafter appear, may be achieved will be better understood from the following description, having reference to the accompanying drawings, of a preferred embodiment of the invention including a modification thereof, given by way of example only and without implied limitation of the scope of the invention, which is defined in the hereto appended claims.

In the drawings

Figure 2 is a side elevation largely in axial section of part of an embodiment of the invention illustrating a modification, the embodiment being otherwise similar to that illustrated in Figure 1;

Figure 3 is an enlargement of part of Figure 2;

Figure 4 is a transverse section on the line IV—IV of Figure 2; and

Figure 5 is a transverse half-section on the line V—V of Figures 1 and 2.

Figure 1:
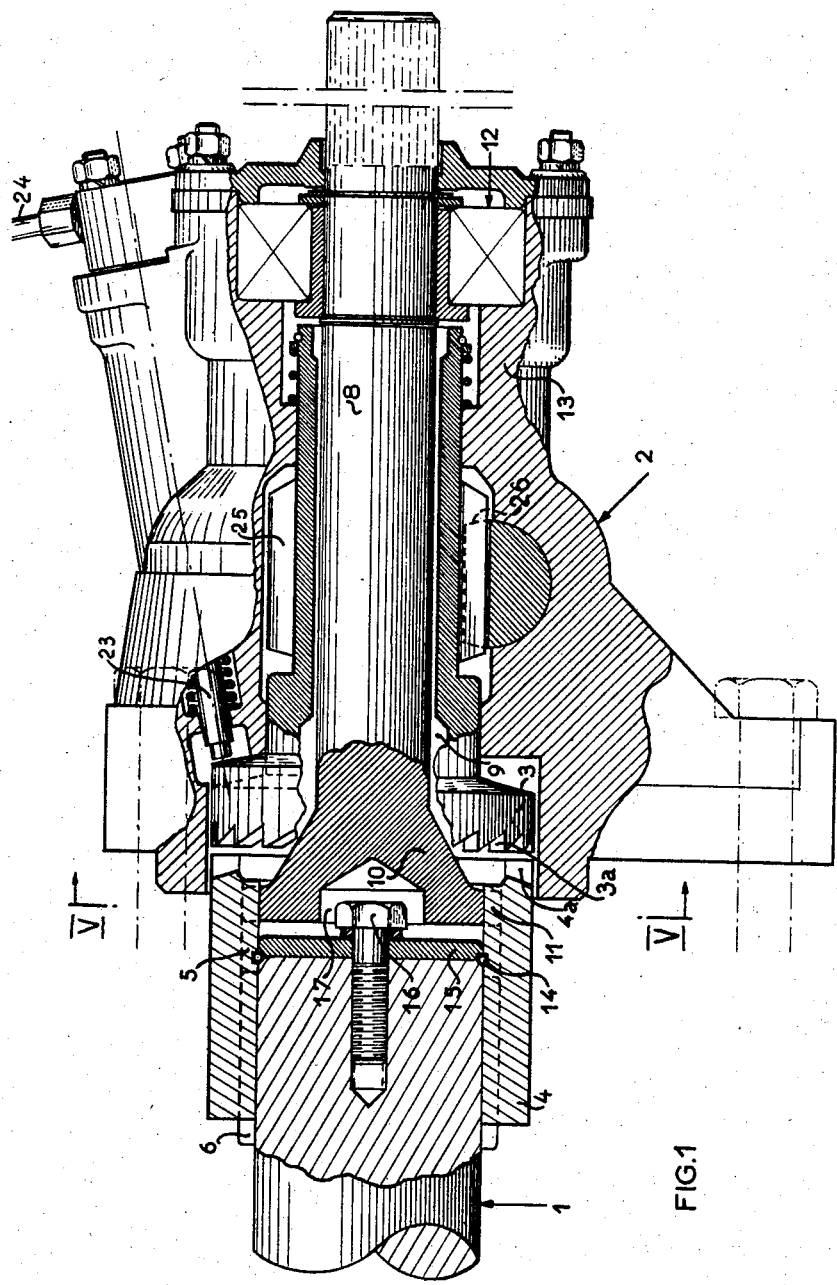
Figure 1 is a side elevation, largely in axial section, of an embodiment of the invention.

In the embodiment of the invention illustrated in Figure 1, one end of a power-transmitting shaft, designated by 1, of an internal combustion engine is shown partly in axial section. The rest of the engine is not illustrated. Shaft 1 may be the crank-shaft or a counter-shaft geared thereto in any way. Numeral 2 designates the body of a starter-motor which is securable to the fixed structure of the engine by studs shown in chain-dotted lines. On the end of shaft 1 is mounted a coupling member constituted by a sleeve 4, the right hand end of which (as seen in the figure) terminates in a ratchet-toothed face 4a constituting a drivable claw or coupling element. Sleeve 4 has internal splines 5 defining between them internal keyways which engage slidably with keys 6 formed integrally on shaft 1.

The sleeve 4 is axially located with respect to shaft 1 by means of a circlip 14 made of piano-wire and lodged in an internal circumferential groove of the sleeve 4. About half the thickness of circlip 14 extends from the inner surface of sleeve 4 forming a circular rib which is trapped between a small abutment surface formed on the end of shaft 1 and a similar complementary surface formed on a clamping washer 15, said surfaces together forming an annular groove. Clamping washer 15 is secured to shaft 1 by a central clamping screw 16 engaging an internally screw-threaded axial recess of said shaft.

It will be seen that sleeve 4 extends beyond the end of shaft 1 exposing a part of the keyways defined by splines 5 for a purpose hereinafter described.

The starter shown as a mere illustration comprises a hollow shaft 9 having an enlarged end 3 presenting a ratchet-toothed face 3a constituting a driving claw or coupling element complementary to and engageable with the toothed face or coupling element 4a. Said shaft 9 is rotatably and slidably mounted in the starter-body 2. For axially displacing the shaft 9 to engage the toothed faces 3a and 4a mutually, a pusher rod 23 actuated by means not illustrated engages the rear face of the enlargement 3 of the shaft 9. The actuating means of rod 4 is preferably an auxiliary hydraulic jack of which the feed pipe is indicated at 24. Fast on shaft 9, and preferably integral therewith, is a pinion 25 in engagement with a toothed rack 26 actuatable by any suitable means, such as a main hydraulic jack (not illustrated) for rotating pinion 25 and shaft 9. For full details of preferred hydraulic means for axially displacing and rotating shaft 9 reference may be made to my co-pending application for "Starting Device," Serial Number 634,730, filed in U.S.A. on January 17, 1957.

Coaxially nested with clearance within the hollow shaft 9 is a solid shaft 8, which extends at each end beyond shaft 9. The right hand end of shaft 8 (as seen in the figure) is rotatively supported and axially located by means of a bearing 12, preferably of the ball or roller type, mounted in the body 2, and extends externally of said body to provide a power take-off for which purpose its projecting end is shown splined in the conventional manner. The bearing 12 is of the swivel or other type capable of accommodating small angular deviations of alignment of the shaft 8. The other (left-hand) end of shaft 8 is enlarged at 10 and terminates in a flange furnished with external splines 11, which are engaged in the internal keyways of sleeve 4 defined by the splines 5. It will be seen that the axial length of the splines 11 is less than the otherwise unobstructed parts of the keyways in which they are engaged, that there is a clearance between the face of the terminal flanged end 10 of the shaft 8 and the washer 15, and that the flanged shaft end 10 is centrally recessed at 17 to accommodate the head of screw 16 with clearance, thus allowing the shaft 8 to float axially with respect to the shaft 1. This freedom to float axially not only accommodates manufacturing tolerances as between the engine and the combined starter-motor/power take-off unit, having regard more especially to the fact that the latter may be required to be fitted to different engines, but relieves the bearing 12 of axial preloading transmitted through the shaft 8.

In the form of construction illustrated in Figure 1 and thus far described, the outside diameter of the flanged end 10 of shaft 8 taken to the bases of splines 11 is equal to that of shaft 1. This limitation may frequently be inconvenient. When the outside diameter of shaft 1 is less than that of the flanged end 10, the modification illustrated in Figures 2 to 4 may be adopted, in which the shaft 1 is capped by an adapter cap member 18 keyed to shaft 1 by loose keys 19 engaged in complementary keyways of the shaft and cap member. The latter has a radially inwardly directed flange 27 trapped between the end of shaft 1 and the washer 15, whereby the cap member is clamped to the shaft by the screw 16. In this case the keys 6 are integrally formed on the cap member 18, whose outside diameter to the base of the keys is equal to the inside diameter of sleeve 4. In this case too the annular groove locating the circlip 14 with respect to the shaft 1 is formed by annular half-grooves in cap member 18 and washer 15. In other respects the embodiment of Figures 2 to 4 is similar to that of Figure 1. In both cases the keys 6 and splines 11 have straight, parallel axially aligned flanks; and the keys 6 fit the keyways defined by the internal splines 5 of sleeve 4 substantially without clearance, but in order to allow for slight angular misalignment of shafts 1 and 8 the depth of the splines 11 of end 10 of the shaft 8 is slightly less than that of the keyways of sleeve 4 in which they engage, so that if the internal splines 5 of sleeve 4 bottom on the interrupted cylindrical surface of the flanged end 10 of shaft 8 between the splines 11, as at 21 (Figure 5) there is a tip clearance 22 (Figure 5) between said splines 11 and the keyways defined by splines 5.

What is claimed is:

In the drive of an engine shaft having an externally splined end portion by a starter device including a rotatable and longitudinally shiftable annular driving clutch member, a sleeve constituting a driven clutch member formed with inner splines, an internally and externally splined tubular adaptor in splined engagement with said end portion of the engine shaft and said sleeve to connect the latter to said engine shaft, said adaptor having an end portion extending beyond said engine shaft, an internal circumferential groove in said sleeve, a circlip clamped to said end portion of the adaptor and engaging said groove of the sleeve whereby the latter is axially located in a position in which a length portion of the sleeve extends beyond the adaptor, and an extension for said engine shaft through said driving clutch member having outer splines in engagement with the inner splines on said length portion of the sleeve, the splines of said extension being of small axial length, and the splines of said sleeve and of said extension having a slight play whereby small angular deviations of the axial alignment of the extension relatively to that of the sleeve can be accommodated.

References Cited in the file of this patent

UNITED STATES PATENTS

| | | |
|---|---|---|
| 2,121,507 | Morgan | June 21, 1938 |
| 2,136,947 | Morgan | Nov. 15, 1938 |
| 2,258,159 | Nardone | Oct. 7, 1941 |
| 2,453,215 | Gilbert | Nov. 9, 1948 |
| 2,471,974 | O'Malley | May 31, 1949 |
| 2,796,856 | Gratzmuller | June 25, 1957 |

FOREIGN PATENTS

| | | |
|---|---|---|
| 762,644 | Germany | Oct. 20, 1952 |